Patented July 10, 1951

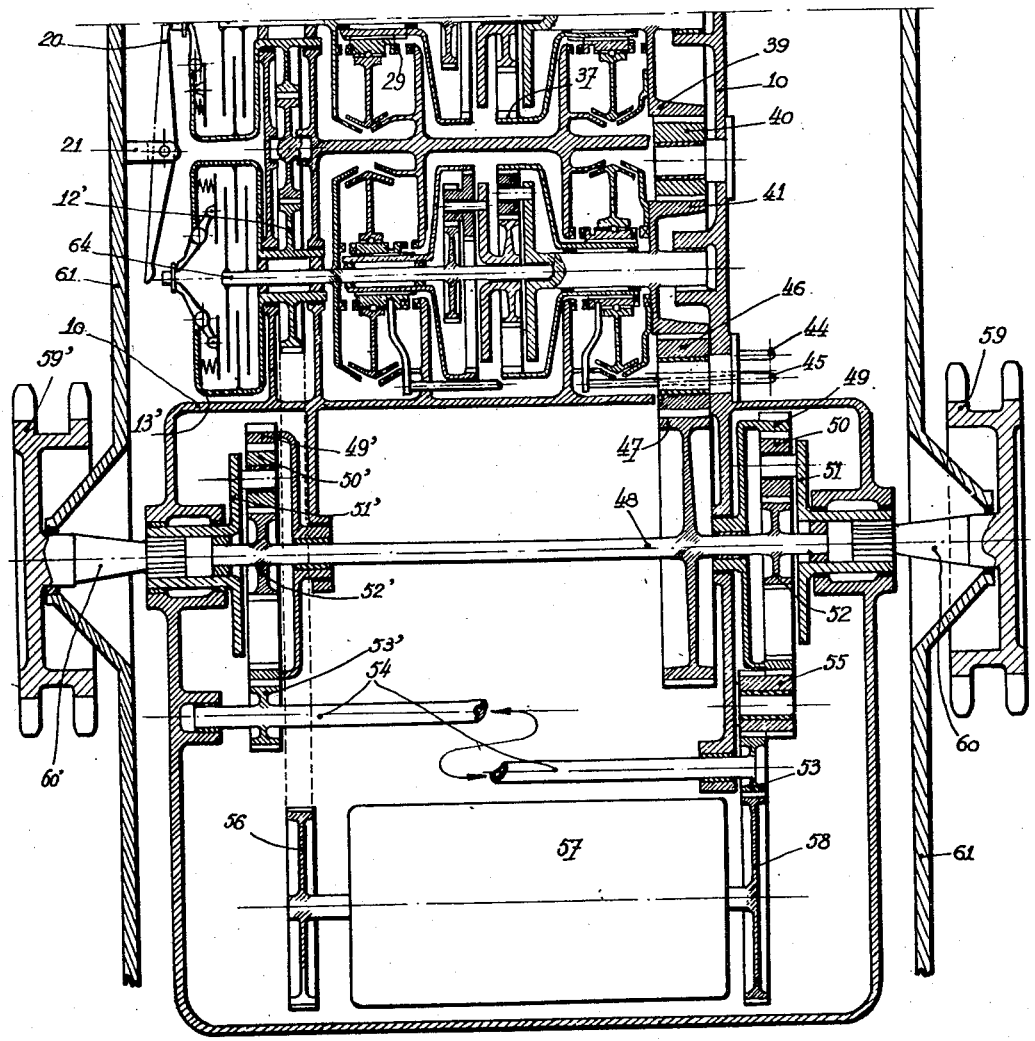
Fig. 1ᵃ

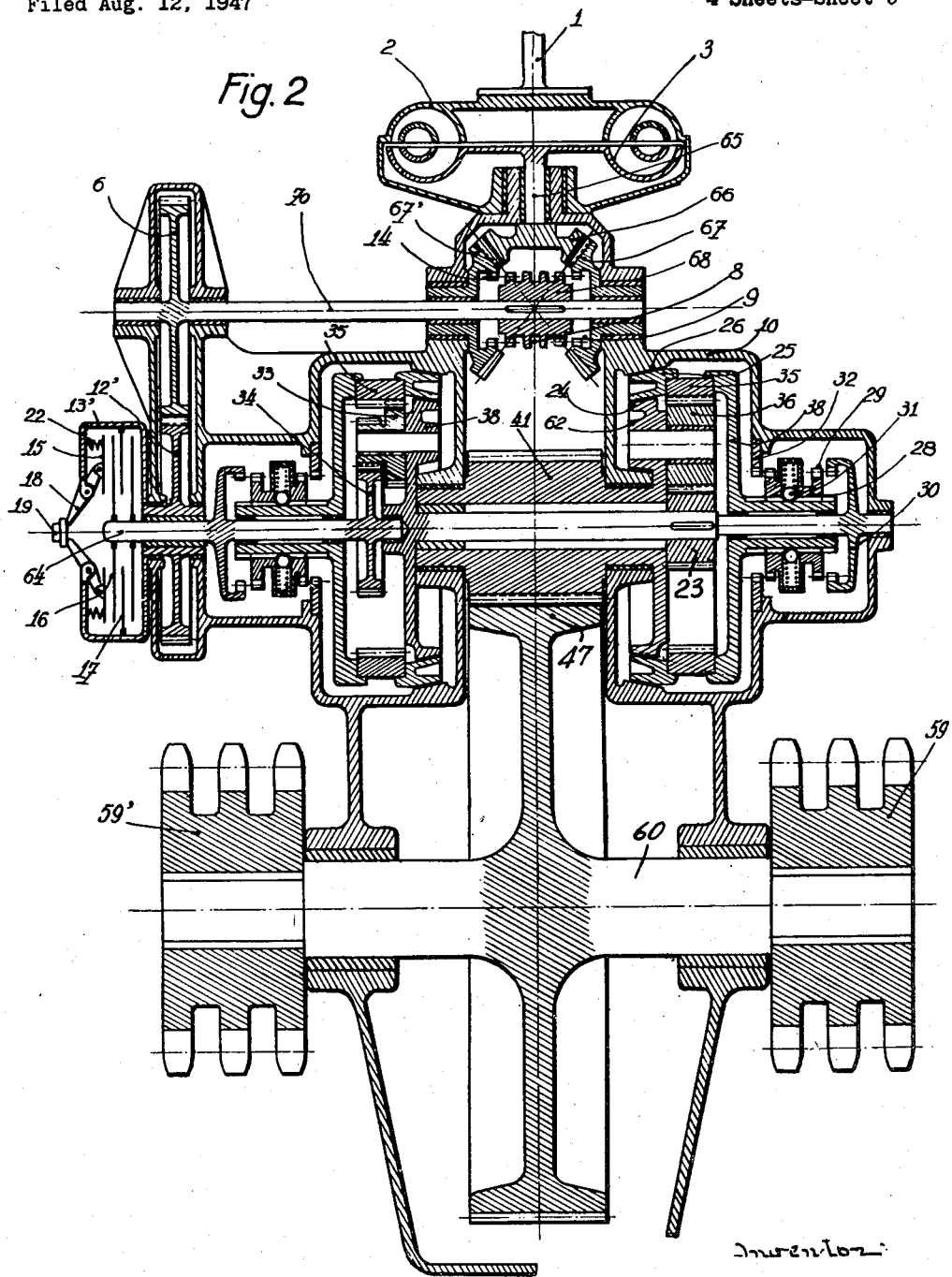

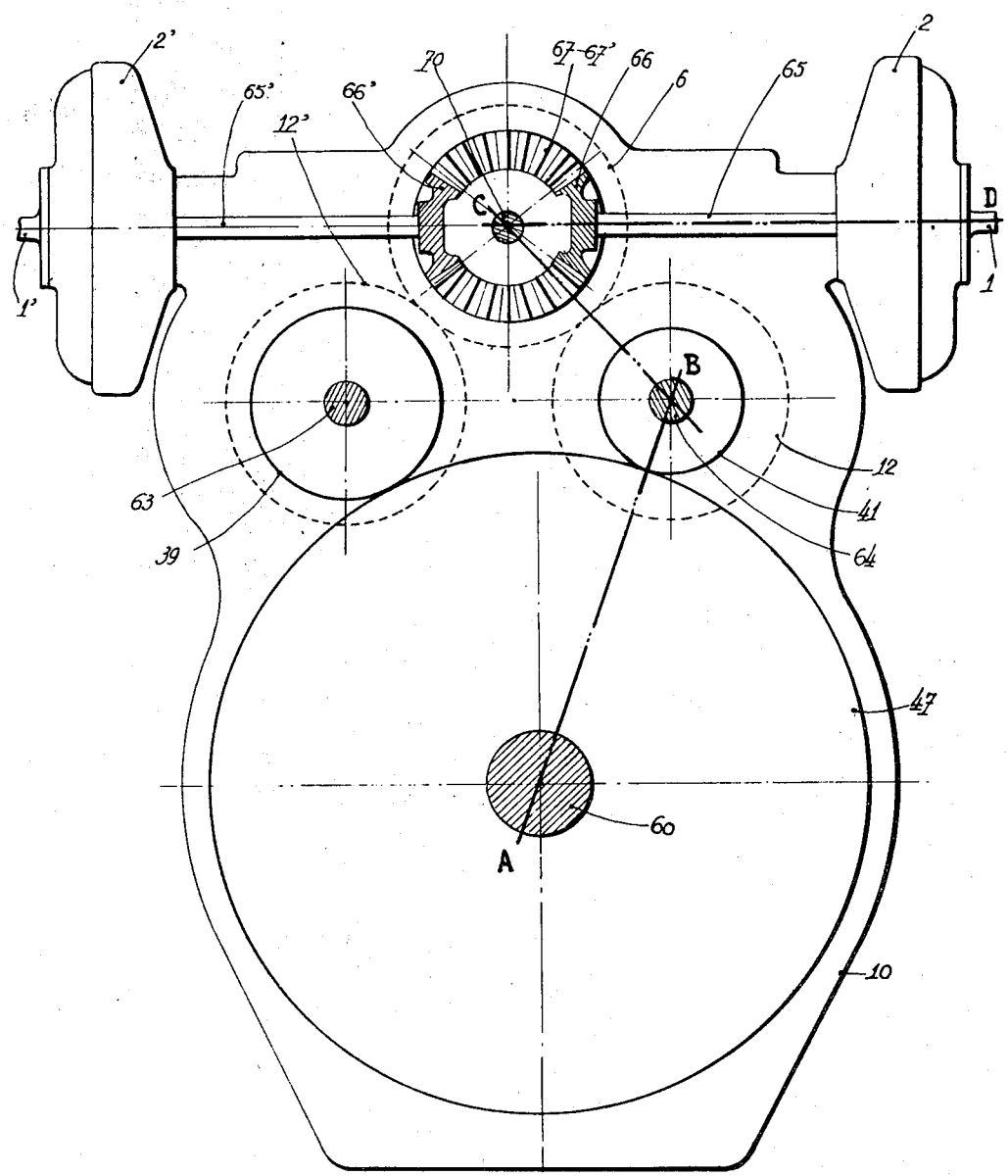

2,560,216

UNITED STATES PATENT OFFICE 2,560,216

MECHANICAL TRANSMISSION

Antoine Claude Marie Henri Coponat, Paris, France

Application August 12, 1947, Serial No. 768,133
In France November 7, 1944

5 Claims. (Cl. 74—682)

This invention relates to mechanical transmissions and, more particularly, to such a transmission capable of delivering high output torques over a wide speed range without excessive stresses on the transmission components.

The invention transmission is particularly designed to deliver power from a thermal engine, such as an internal combustion engine, to the driving wheels of a road traction vehicle or a rail traction vehicle. For this purpose, the transmission is designed to provide either four or eight output speeds and to provide rapid speed changing without interruption of the load on the engine.

According to the invention, the torque or couple converting element, generally termed the "change speed gear," comprises two drives parallel with each other and identical in their constituent members with the exception of the output pinions. In operation, these two drives are driven at the same speed. There is mounted at the input end of each of these drives a friction clutch or coupler the driving element of which is controlled by the engine. These two clutches may be clutches of reduced dimensions for they need not slip on starting. They may furthermore have to transmit a less couple than that of the engine if their speed of rotation is greater than that of the latter.

A rocking lever or any similar device prevents these two clutches from operating simultaneously: when one of the two clutches is engaged the other is necessarily disengaged, so that at each instant only one drive is driven by the engine.

At the output end of each drive there is mounted a toothed drive pinion, these two pinions being of different diameter, the diameters of the larger and the smaller one of said pinions being related by the ratio $$\frac{D}{d} = a$$

where $a$ is the rate of uniform progression chosen for the whole range of speeds. These two pinions are constantly in engagement with a common driven wheel keyed on a third shaft, termed "load shaft," and by driving it successively at the same transmission shaft speed, provide an ecceleration or a deceleration of the load shaft corresponding to the ratio $a$.

In principle the ratio of one speed combination to the next one on the same shaft is in the ratio $a^2$, and the speed changing procedure is as follows: Assume that the speed changing devices of both drives are set in the lowest speed range, the input ends of both drives being drivable at the same rate by the engine, and that the clutch lever is set to engage the drive having the smaller pinion with the engine. The clutch lever is then operated to disengage the smaller pinion drive and to engage the larger pinion drive. Thereby, the load shaft is accelerated to a speed having the ratio $a$ to the initial speed.

To continue the acceleration, the smaller pinion drive, now disengaged at the engine end, is set in the next higher speed range having the ratio $a^2$ to the first speed range. When the clutch lever is again operated, the load shaft is accelerated to a speed having the ratio $a^2$ to its initial speed and the ratio $a$ to its second or previously accelerated speed.

In reducing speed, the same procedure is followed. Assuming the larger pinion to be active, the clutch lever is operated to make the smaller pinion the torque transmitter. Then the inactive larger pinion drive is set for the next lower speed and the clutch lever operated to make the larger pinion the torque transmitter. This is continued in alternation to reduce the speed to the desired value.

If it is desired to obtain a total of eight speeds, each of the drives, the use of which has just been explained, includes two successive epicyclic trains. It is known that an epicyclic train is capable of providing two speeds: direct drive and a reduction which is a function of the relative dimensions of its constituent elements (sun-gear, planetaries and annuli). In this way four speed ratios may be obtained, in each drive, by means of two trains, by combining: (1) the speed-reducing positions of both trains; (2) the greatest speed reduction with a direct drive; (3) the smaller reduction with direct drive and (4) both direct-drive positions. The total range of speeds for both drives is thus eight speeds, but it should be noted that, if the over-all difference required over the complete transmission is not very high, this transmission may be simplified by having each drive include only one epicyclic train.

The transmission may if desired comprise a hydraulic clutch of any known type, automatically disengaging the engine when the latter drops below a certain rate of operation. It thus permits of driving the engine without a throttle-control pedal and without a de-clutching pedal and simply by means of a lever or a handwheel for effecting the shifts in speed.

With the foregoing in mind, it is an object of the present invention to provide an improved torque transmission for traction vehicles.

Another object is to provide such a transmission having a wide range of selective output speeds capable of effecting smooth acceleration and deceleration.

These, and other objects, advantages and novel features of the invention will be apparent from the following description and the accompanying drawings. In the drawings:

Figs. 1 and 1a constitute a developed view, in a single plane, of the invention transmission as applied to driving a road traction vehicle.

Fig. 2 is a similar view of the drive for a rail vehicle.

Fig. 3 is an end view of the transmission, more particularly of the embodiment shown in Fig. 2.

Figure 1:
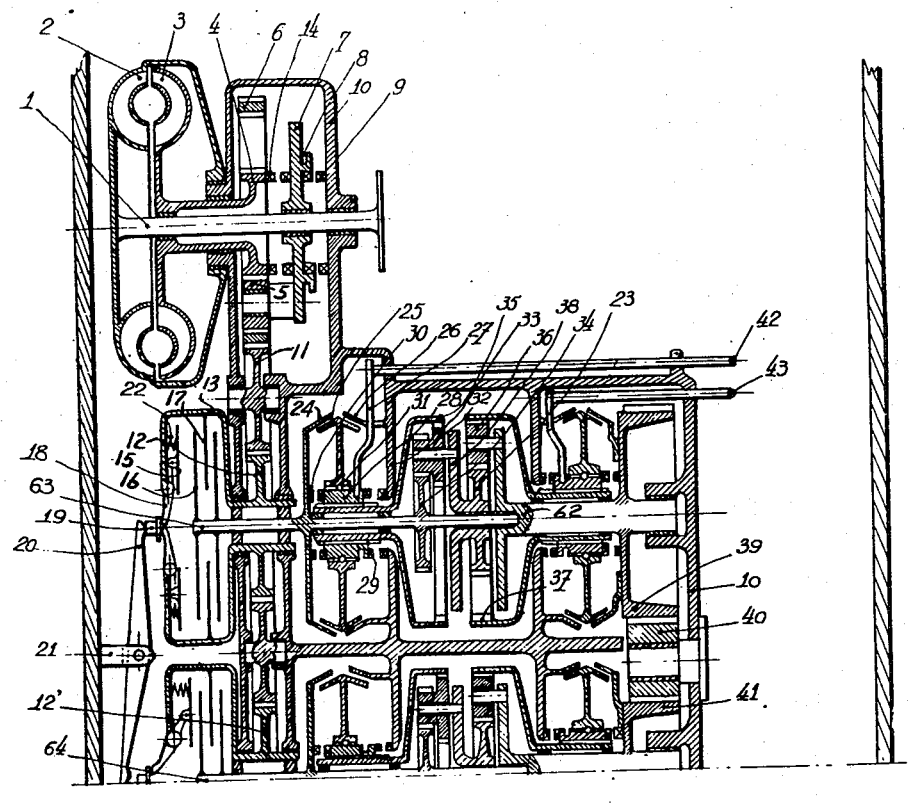

In the embodiment of Fig. 1, the shaft 1, which is coupled directly with the thermal engine (not shown) and is assumed to be mounted transversely of the vehicle, carries an impeller 2 of a hydraulic coupling, the runner 3 of which is keyed on to the hub of the sun-gear 4 of an epicyclic train having planetaries 5 on a slidable flange or disk 7, and a rim or annulus 6 which is toothed internally and externally. This train is used as a speed reverser, one of the directions of rotation being obtained by engaging the planetary carrier flange 7 having jaws 14, with the sun-gear 4, and the other by engagement of the jaws 9 securing the flange 7 with the casing 10. These various engagements are effected by the operation of a fork, not shown, engaging the channel 8 of the disk 7. The above-mentioned provision of the hydraulic coupler 2—3, which is disengaged upon deceleration of the engine, allows operation of the reversing control.

The outer teeth of the annulus 6, which provide for output of the movement from the reversing device, engage an intermediate pinion 11 which meshes with the pinion 12 keyed on the hub of the clutch housing 13 which encloses the clutch pressure plate 15 actuated by the springs 22, the clutch disc or discs 17 integral with the cover 13 and the set of clutch discs 16 integral with the shaft 63 which is one of the pair of shafts constituting the change speed gear. It is through compression of the plate 15 and of the discs 16 and 17 that movement is transmitted by friction to the shaft 63. Disengagement takes place when, through the radiating levers 18 actuated by the small flange 19, the pressure of the plate 15 is removed. The clutch of the shaft 63 is represented in the position of disengagement, while for the second one 64 of the pair of shafts constituting the change speed gear, extending parallel to the first-described shaft and arranged exactly in the same way, the related clutch is shown in the position of engagement at 13'.

Alternation of the engaged and disengaged condition for these two shafts is effected by the rocking shaft 20, oscillable in the fork 21 which is fixed, for example, on the frame 61 of the vehicle. It will be seen that owing to this arrangement, it is impossible for the clutches 13 and 13' to be simultaneously engaged or simultaneously disengaged.

The shaft 63 carries the sun-gear 34 of a first epicyclic train the other elements of which are the planetaries 33, the inner toothed annulus 35 and the flange 38 carrying the pivots of the satellites 33. The hub of the toothed annulus 35 is freely mounted on the shaft 63 and mounts, by means of splines, the slide member 28 of a synchronizer. This slide block is provided at its two ends with jaws 29 and carries, through a splined connection, the double cone 25 for precoupling. This cone 25 may be shifted axially and is maintained in the shifted direction by a set of balls 31 pressed by springs into notches formed in the slide block 28. An actuating fork 27 engages a groove in the latter, and said fork 27 is controlled through the operating rod 42.

The male double cone element 25 is adapted, according to the direction of displacement of the slide block 28, to engage either the female rotating cone element 24 integral with the shaft 63, and thereby also with the sun-gear 34, or the fixed female cone element, 26 carried by the plate 32 which is integral with the casing 10 and carries clutch jaws adapted to come into engagement with jaws 29 of the slide block 28.

The planetary-carrier plate 38 of the first train carries on its hub the sun-gear 23 of a second epicyclic train, the planetaries of which are 36 and the toothed annulus 37. The hub of this annulus carries the same type of synchroniser as the first train; the female cone element of this synchroniser is carried by the drive pinion 39, which is keyed on the shaft or hub of the planetary carrier plate 62.

The shaft 64 parallel with the shaft 63 carries identically the same parts as the shaft 63 with almost the only exception that its output pinion 41 is much smaller than the pinion 39; the ratio between the diameters of these two pinions being $a$. In the embodiment shown in Fig. 1 the pinion 41 is connected to the pinion 39 through a freely-rotatable pinion 40 and, through another freely rotatable pinion 46, to the pinion 47 which will be referred to below.

It should be noted that these pinions 40 and 46, as also the freely rotatable pinion 11 previously referred to, have merely been shown to facilitate comprehension of the mechanism. Actually, the annulus 6 could be made to directly engage the pinion 12 and the gear 47 to engage the pinions 39 and 41 and be actuated alternately by each one of said latter pinions; this in fact is the arrangement shown in Fig. 3. It is easy to understand that in the embodiment shown in Fig. 1, the drive of the gear 47 can readily take place from the pinion 39, through the intermediary of the pinions 40, 41 and 46, the pinion 41 then being itself loose since the shaft 64 is at this time disengaged.

The manipulation of the combinations of the four epicyclic gear trains is carried out by means of fork rods 42, 43, 44 and 45 which may be connected to any suitable control, direct, servo or automatic.

The gear 47 which, as just stated, may derive its motion selectively from the shaft 63 or from the shaft 64, is keyed on the shaft 48 rigidly connecting the sun-gears 52 and 52' of two further epicyclic trains, the annuli of which are 49 and 49' toothed internally and externally and the planetaries 50 and 50' of which are carried respectively by the planetary-carriers 51 and 51'. The external teeth of the annuli 49 and 49' respectively mesh with the pinion 55 and 53'. The pinion 55 is loosely mounted on a fixed pivot mounted on a wall of the casing 10, whilst the pinion 53' is integral with the shaft 54 carrying at its other end the pinion 53 in mesh with the loose pinion 55. Actually, the pinions 53 and 55 are mounted side by side; however, the plane containing their axes has been shown rotated so as to make their connection more plainly visible and the shaft 54 is shown broken in order to conform with this rotation of said plane.

The pinion 56, which engages the pinion 12 and 12' of either one of the drives, controls the movement of a reversible speed changer 57 of any standard mechanical, hydraulic or electric type adapted to impart to the pinion 58 in either one of two directions of rotation and, progressively, any desired speed between O and V, the speed V being that of the pinion 56. Due to the interposition of the pinion 55, when the output shaft of the reversing variating device 57 rotates, it imparts a reverse movement to both toothed annuli 49 and 49', by means of its output pinion 58 and the pinions 53, 55 and 53'.

The drive is transmitted through both reducing epicyclic trains to the hubs of the satellite-carriers 51 and 51' themselves connected to the shafts 60 and 60' which drive the sprocket or chain wheels 59 and 59' constituted by simple toothed wheels for chain caterpillars.

Operation of the couple converter constituted by the pair of parallel shafts 63 and 64 has already been explained. The function of the synchronisers will be easily understood: they are only operated on the disengaged shaft (63 in the example shown), while the shaft 64 which is engaged is transmitting the drive. A preparation of the desired speed ratio is thus effected by preselection and this speed ratio is then made effectively operative through the correlated operation of the clutches 13 and 13'. Placing at the "top" position of the combination which has just been used takes place, automatically or by hand, on the shaft which has just been disengaged, upon its being disabled.

As regards the operation of the system of control of the sprocket or chain wheels, this is as follows:

The two epicyclic trains 49, 50, 51, 52 and 49', 50', 51' and 52' play a three-fold role: as a differential gearing, indispensable to any road vehicles in turns, as a differential necessary for steering-control and as speed-reducing devices for the sprocket or chain wheels.

When moving in a straight line, the output shaft of the speed changer 57 is made stationary and thus serves as a fixed fulcrum for both annuli 49 and 49' through the intermediary of the pinions 53, 53' and 55; the symmetrical epicyclic trains then function as simple reducing gears.

In a turn, the speed changer 57, under control of the driver of the vehicle, causes the pinion 58 to be rotated more or less fast according to the radius of the turn to be negotiated. As a consequence of this rotation, the toothed annuli 49 and 49' rotate one in the direction of travel and the other in the reverse sense, thus producing an acceleration in one of the caterpillars, and a deceleration in the other, and this brings about the turning of the vehicle.

If the latter is stopped, for example by placing the shafts 63 and 64 at stop position, and if the speed changer 57 is set in operation, the wheels 59 and 59', and consequently the caterpillars, are caused to rotate in opposite directions to each other, and the vehicle pivots on itself in one direction or the other according to the direction imparted by the speed changer 57 to the pinion 58.

Fig. 2, which is a section on the line A, B, C, D of Fig. 3, shows a modification of the transmission as applied to a railway vehicle without the use of differential. The various constituent members of Fig. 1 will be found on this figure, indicated by the same reference numerals. The driving shaft 1 of the engine is connected through a flange to the impeller 2 of the hydraulic coupler, the runner 3 of which is keyed on to the input shaft 65 of a reverser which, as a result of the angular position of the shafts 63 and 64 with respect to that of the engine drive shafts, comprises a set of three bevel pinions. The bevel pinion 66 simultaneously engages a pair of bevel gears or annuli 67 and 67', freely mounted on the output shaft 70 of the reverser. According to whether the slide member 68, adapted to slide along this shaft under the action of a fork engaged in its groove 8, is displaced in one direction or the other, it comes into engagement with the jaws 9 or 14 and will cause the shaft 70 to be driven from the annulus 67 or the annulus 67'. Said annuli rotating in opposite directions from each other, the direction of rotation of the shaft 70 will thus be altered and with it the direction of rotation of the whole of the subsequent transmission up to the chain rims 59, 59'.

As in the case of Fig. 1, the pinion 6 will transmit its movement to the pinions 12 and 12' keyed on the casings 13 and 13' of the clutches mounted at one end of each of the two shafts 63 and 64. The shaft 63 which is identical with the shaft 64, with the exception of its outlet pinion 39 (see Fig. 3), is not shown on Fig. 2.

The operation of the shafts 63 and 64 is identical with that of the same members in the modification shown in Fig. 1, but here the synchronizer has a different form. The fixed cone 26 carried by the casing 10 is simplified, whilst preserving the same general arrangement and the same operation. As regards the other female cone 24, it is rotatable and carried by the satellite carrier plate 38.

The pinion 41 of the shaft 64 and the pinion 39 of the shaft 63 (not shown) both engage the toothed annulus 47 mounted on the shaft 60 which carries at its ends the chain control sprockets 59 and 59'. The shaft 60 could, furthermore, also carry pivotal joints extended by longitudinal shafts driving axle bridges; naturally, the transmission will be mounted in such manner that the shaft 60 is longitudinal.

There is shown in Fig. 3 a modification wherein the drive for the transmission is from two thermal engines mounted axially of the vehicle, on each side of the transmission. This arrangement is possible due to the properties of the hydraulic slip connectors which allow of the simultaneous or individual use of two engines applied to a common load and make it possible to stop either one of the engines without interrupting the operation of the whole. In this figure, the driving shafts are 1 and 1', the coupling members 2 and 2' and the reversing shafts 65 and 65'.

The described transmission has numerous advantages. Due to the use of epicyclic gear trains, high torques may be transmitted and a wide speed range, such as 1:20 is obtainable. Rapid shifting is possible due to the alternately engageable clutches, with the speed changes being graduated, for example, in geometrical progression. The hydraulic coupling permits the reversing gear to be located between the engine and transmission and to be small in size since it must handle only the engine output torque. There is no bearing reaction resulting from the speed changers, so that the bearings are loaded only by the weight of the borne elements. The epicyclic trains prevent excessive reaction shocks and provide for the input shafts to operate at high speeds thus reducing the couple force and the dimensions of the parts. The parts 39—47 and 41—47, which handle the highest couples, do not have any shiftable elements. The positive jaw clutches eliminate any necessity for pressure exertion after engagement.

In addition to the foregoing advantages, the speed range can be halved, without any substantial alteration in the transmission, by utilizing only one epicyclic train in each drive. Furthermore, the use of identical epicyclic trains in both drives reduces the number of different parts required, facilitating maintenance and replacement. The epicyclic trains allow substantially noiseless operation and, in certain speed settings, have a transmission efficiency of close to 100%. Furthermore, these trains, in combination with the hydraulic coupling, allow elimination of the usual clutch pedal and accelerator pedal.

While specific embodiments of the invention have been shown and described in detail to illustrate the application of the invention principles, it should be understood that the invention may be otherwise embodied without departing from such principles.

What I claim is:

1. In a variable speed power transmission interposed between a driving shaft and a load shaft, the improvement comprising in combination a pair of identical epicyclic change-speed gear trains arranged in parallel relation, each train having an input shaft and an output shaft; each of said output shafts being constantly geared to the load shaft and each of said output shafts being adapted to drive the load shaft at a different rate these rates having a predetermined ratio; both input shafts being drivable at the same rate by the driving shaft; speed selecting means for each of said gear trains; and coupling means alternately operable to connect one input shaft at a time to the driving shaft while automatically at the same time disconnecting the other input shaft therefrom; whereby said gear trains are alternately operable to connect the driving shaft with the load shaft and a speed selection is effected in one gear train while the same is inoperative, whereupon the same by the operation of said coupling means is actively connected to the load shaft while the other previously operative gear train is disconnected therefrom.

2. In a variable speed power transmission interposed between a driving shaft and a load shaft, the improvement comprising in combination a pair of identical epicyclic change-speed gear drives arranged in parallel relation each drive having an input shaft and an output shaft and each being composed of at least two epicyclic change-speed gear trains in series; each of said output shafts being constantly geared to the load shaft and each of said output shafts being adapted to drive the load shaft at a different rate, these rates having a predetermined ratio; both input shafts being drivable at the same rate by the driving shaft; speed selecting means for each of said gear trains; and coupling means alternately operable to connect one input shaft at a time to the driving shaft while automatically at the same time disconnecting the other input shaft therefrom; whereby said gear trains are alternately operable to connect the driving shaft with the load shaft and a speed selection is effected in one gear train while the same is inoperative, whereupon the same by the operation of said coupling means is actively connected to the load shaft while the other previously operative gear train is disconnected therefrom.

3. In an variable speed power transmission interposed between a driving shaft and a load shaft, the improvement comprising in combination a pair of identical epicyclic change-speed gear trains arranged in parallel relation each train having an input shaft and an output shaft; each of said output shafts having a pinion constantly geared to a common pinion on the load shaft and the diameters of the output pinions having a predetermined ratio to each other; both input shafts being drivable at the same rate by the driving shaft; speed selecting means for each of said gear trains; and coupling means alternately operable to connect one input shaft at a time to the driving shaft while automatically at the same time disconnecting the other input shaft therefrom; whereby said gear trains are alternately operable to connect the driving shaft with the load shaft and a speed selection is effected in one gear train while the same is inoperative, so that the same, upon operation of said coupling means is, actively connected to the load shaft while the other previously operative gear train is disconnected therefrom.

4. A power transmission unit as claimed in claim 1 in which said coupling means comprises a pair of clutches each having a driving element constantly driven at the same speed by the drive shaft, and a driven element each connected to the input shaft of a different drive; and means operable alternately to engage one clutch while maintaining the other clutch disengaged.

5. A power transmission unit as claimed in claim 1 in which said coupling means comprises a pair of friction clutches each having a driving element constantly driven at the same speed by the drive shaft, and a driven element each connected to the input shaft of a different drive; a clutch operating arm pivoted intermediate its ends and having each end connected to a different driving element to alternately engage one clutch while disengaging the other clutch.

ANTOINE CLAUDE MARIE HENRI COPONAT.

REFERENCES CITED

The following references are of record in the file of this patent:

UNITED STATES PATENTS

| Number | Name | Date |
|---|---|---|
| 867,828 | McGill | Oct. 8, 1907 |
| 1,151,762 | Day | Aug. 31, 1915 |
| 1,157,307 | Henderson | Oct. 19, 1915 |
| 1,500,588 | Lavoie | July 8, 1924 |
| 1,903,635 | Saives | Apr. 11, 1933 |
| 2,052,815 | Wilsing | Sept. 1, 1936 |
| 2,164,729 | Wilson | July 4, 1939 |
| 2,201,847 | Cheng | May 21, 1940 |
| 2,336,912 | Zimmermann | Dec. 14, 1943 |

FOREIGN PATENTS

| Number | Country | Date |
|---|---|---|
| 604,178 | Great Britain | June 29, 1948 |

Certificate of Correction

Patent No. 2,560,216                                                              July 10, 1951

ANTOINE CLAUDE MARIE HENRI COPONAT

It is hereby certified that error appears in the above numbered patent requiring correction as follows:

In the grant, line 14, strike out "of SEVENTEEN years"; same line, after "grant" insert *until November 7, 1964*; in the heading to the printed specification, line 7, before "5 Claims", insert the following: *Section 1, Public Law 690, August 8, 1946. Patent expires November 7, 1964*;

and that the said Letters Patent should be read as corrected above, so that the same may conform to the record of the case in the Patent Office.

Signed and sealed this 4th day of September, A. D. 1951.

[SEAL]

THOMAS F. MURPHY,
*Assistant Commissioner of Patents.*